June 3, 1958  R. V. ELLIOTT ET AL  2,837,082
ACCELEROMETER
Filed March 18, 1954
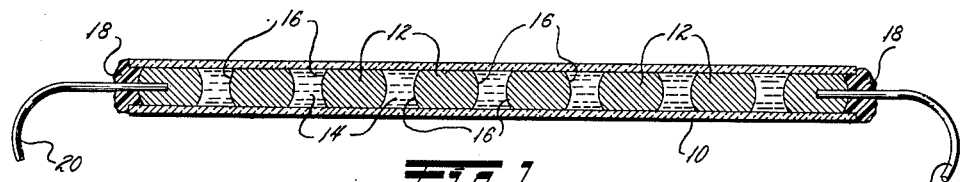
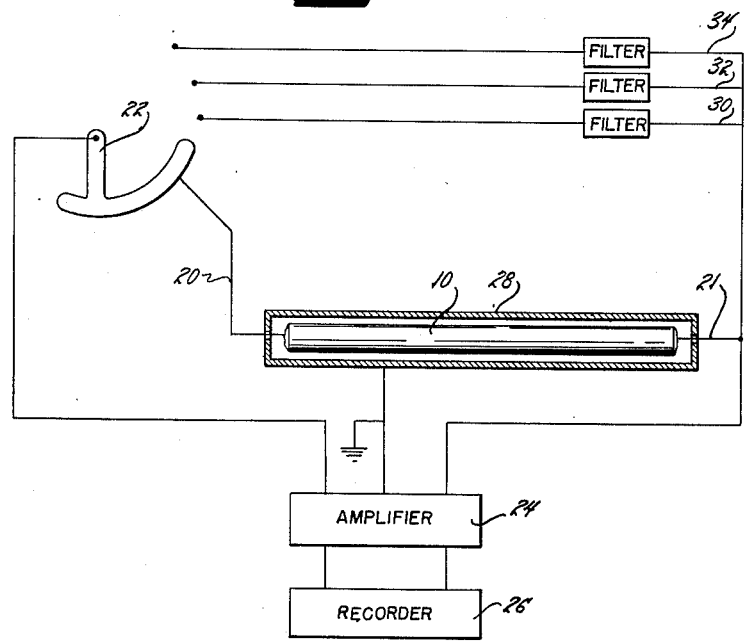
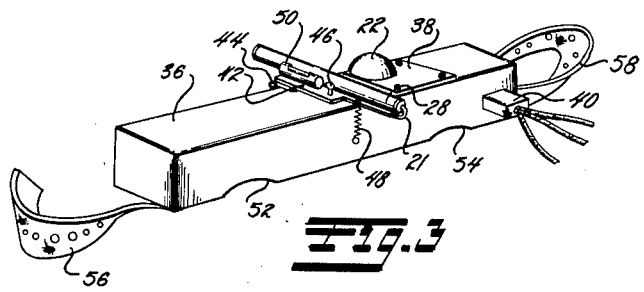
INVENTOR
ROBERT VINCENT ELLIOTT
ROBERT GAY PACKARD
BY
ATTORNEYS

United States Patent Office 2,837,082
Patented June 3, 1958

2,837,082

ACCELEROMETER

Robert Vincent Elliott, Cincinnati, Ohio, and
Robert Gay Packard, Waco, Tex.

Application March 18, 1954, Serial No. 416,986

5 Claims. (Cl. 128—2.06)

This invention relates to a linear accelerometer and particularly to an accelerometer which is especially adapted for measurement of small forces such as those encountered in ballistocardiography.

In applications where unknown forces are to be ascertained, an ideal instrument to use is an accelerometer since force can be directly calculated from acceleration. When a velocity or displacement pick-up is used in such applications it is necessary to differentiate the output to obtain a quantity proportional to the acceleration. Differentiation in many cases turns out to be difficult and unreliable.

At the present time the most feasible methods of obtaining acceleration for subsequent recording are in the use of instruments based on the inertia principle, e. g. instruments used to measure seismic phenomena. Since accurate measurements obtained by seismic instruments depend on a rather large mass, delicately suspended in a sphere or box, their size precludes use directly on the human body or other small bodies and even then such instruments usually are not sufficiently sensitive to provide a reliable output in the range of forces which are encountered in certain fields such as ballistocardiography.

The accelerometer used in this invention is an electrokinetic device, the operation of which is based on the principle of the so-called "U-effect" and relies on a change of the electrical charges at the surfaces of contact between conducting fluids of different densities that are insoluble and do not react appreciably with each other when those surfaces are moved. It is well known that fluids of different densities have electrical charges at their interfaces and as long as such fluids are conductors of electricity, this electrical potential can be recorded. A summary of the experimental work on the "U-effect," as well as applications of the phenomena, is given in the Journal of the Acoustical Society of America, volume 25, in an article published in May 1953, entitled "A survey of the electro-chemical application of ultrasonic waves" by Yeager and Hovorka beginning on page 443.

The construction of the actual pick-up may consist merely of a capillary tube with alternate layers of metallic mercury and an electrolyte such as sulfuric acid or potassium chloride. A plurality of interfaces between the mercury and the electrolyte is produced and changes in the contour of the interfaces causes a voltage proportional to such changes to be developed. The voltage produced by accelerations depends on the diameter of the capillary tube, the exact nature of the relation between output voltage and capillary size being unknown as yet. The output of the capillary tube can then be connected to a suitable amplifying system and the changes of the electrical potential can be recorded or indicated in any desired manner.

Accelerometers of this type are capable of a linear frequency response from zero to 100 cycles per second and an output versus frequency above 2000 cycles per second and show a linear response to forces from zero to $10^6$ dynes, as used in ballistocardiography, and are capable of response to force magnitude to accelerations of 3000 cm./second$^2$. It is therefore apparent that such an accelerometer is capable of being used as a phonograph pickup, a microphone, a stethoscope or as a transducer anywhere an electrical output is desired from a force due to the acceleration of a body.

In the application of an accelerometer in the field of ballistocardiography other factors also become important. The apparatus should be rugged, preferably portable and inexpensive as well as being linear in its response and capable of measuring acceleration rather than merely changes in acceleration. It should also be capable of simple calibration preferably by the use of a one millivolt standardization of the electrocardiograph amplifier and recorder apparatus in most laboratories thereby eliminating the necessity of such additional equipment which is often cumbersome and subject to its own critical standards. With an accelerometer according to our invention anyone possessing an electrocardiograph machine could take ballistocardiograms directly from a patient which would be an accurate quantitative evaluation of the ballistocardiogram in a comparable manner to that now used in electrocardiography.

It is therefore an object of this invention to provide an accelerometer which is portable, rugged and inexpensive to make.

A still further object of this invention is to provide an accelerometer which is easy to construct and has a long life.

A further object is to provide an improved ballistocardiogram.

Another object of the invention is to provide a portable accelerometer which can be used with amplifiers and indicators of standard electrocardiograph machines.

A further object of the invention is to provide a ballistocardiography apparatus that is portable and will give reliable quantitative results.

These and other objects of this invention will become more fully apparent by reference to the appended claims and as the following detailed description proceeds in reference to the accompanying figures wherein:

Figure 1 is a diagrammatic showing of the accelerometer;

Figure 2 shows an electrical circuit in which the accelerometer may be used; and Figure 3 shows the accelerometer on a conventional shin board which is used in making ballistocardiograms.

Referring now to Figure 1 the tube 10 which may be made of glass, rubber, plastic or any non-conducting material is filled with alternate layers of conducting fluids of different densities creating multiple interfaces 16. While other liquids have the necessary electrical and chemical properties and could be used, metallic mercury 12 and one normal sulfuric acid 14 have been found to be satisfactory. At each end of the tube 10 a seal 18 which may be of wax is placed adjacent a layer of mercury. A small electrical conductor such as copper or platinum wire 20, 21 may be inserted in the end layer of mercury adjacent the seal.

At the interfaces 16 of the metal and electrolytic solution, specific absorption of either anions or cations takes place. A diffuse layer adjacent the interface in the electrolyte consists of ions predominately opposite the charge on the face of the layer of metal. The voltage drop across this diffuse layer to the bulk of the solution of the electrolyte is generally referred to as the zeta or electrokinetic potential. When either the surface of the metal or the solution is moved, the diffuse layer is disturbed. Since the diffuse layers at the interfaces are distorted when tube 10 is subjected to an acceleration and the effect is substantially in phase for each set of interfaces, alternating current potentials are established as the tube is vibrated.

The actual inside diameter of each tube 10 is not extremely critical but tubes of a diameter of less than 0.75 millimeter have been found to be more stable than those of larger diameters. The ideal inside diameter has been found to be in the vicinity of 0.3 to 0.5 mm. and such capillary tubes are easily drawn by hand from soft glass tubing. Thick walled capillary tubing can also be used if the inside diameter is not greater than 0.75 millimeter. In addition to the stability factor the smaller the diameter, within certain limits, the greater the electrical output per given number of interfaces. For ballistocardiography a length of capillary tubes approximately 13 to 15 centimeters long and containing 25 to 40 cellules of mercury gives an accelerometer which is adequately sensitive for the forces involved the maximum of which may be on the order of $10^6$ dynes.

The preferred method of loading the tube 10 is set forth as follows. One end of the glass tube is cut off leaving at least 20 to 25 centimeters of capillary attached to other end of the glass tube and a 90° angle is made near the distal tip of the capillary tube. It has been found best to load capillaries in a horizontal position through the small tip by suction with a syringe from the large end of the glass tube. The large end of the capillary tube is attached to the tip of the syringe by means of rubber or plastic tubing, care being taken to locate the glass tubing and the tip of the syringe as closely together as possible thereby allowing little flexibility in this connection. A small cup half filled with metallic mercury and half filled with 1.0 N sulfuric acid is placed at the distal tip of the capillary tube. By gently swinging the tip of the capillary tube alternately in and out of the mercury meniscus and simultaneously creating a negative pressure in the capillary tube by use of the micrometer screw on the syringe, alternate layers of mercury and sulfuric acid can be drawn in the capillary tube. It is best to preload the syringe and capillary tube with 1.0 N sulfuric acid to eliminate compression and expansion properties of a gaseous medium which tend to make negative pressure difficult to control.

When the tube has been loaded to the desired length and with the desired number of mercury cellules a sealing wax seal 18 is applied to the tip of the tube following its removal from the cup. When this has been accomplished the loaded tube may be cut at its desired length near the proximal end and a small copper wire inserted into the end mercury cellule and the end is sealed with sealing wax or other suitable substance. The distal limit of the element is then measured and cut and the above process of inserting an electrical terminal is repeated and the accelerometer element is then finished. In the sealing process a substance that will adhere to the tube with a minimum amount of heat should be used to avoid expansion of the mercury and acid due to heat.

Figure 2 shows the electrical circuit in which the accelerometer may be used in combination with a ballistocardiograph. Accelerometer element 10 is connected by a conductor 20 through a rotary switch 22 to one input of the amplifier 24. The other conductor 21 from the capillary element 10 is connected to the other input of the amplifier. The alternating current potential set up by the capillary element is amplified by an amplifier 24 and the output may be audibly sensed through a speaker or ear phones, visually observed on a cathode ray oscilloscope or may be recorded on a chart or record at recorder 26. This amplifier 24 and recorder 26 may be the amplifier and recorder of a conventional electrocardiograph machine.

A grounding shield 28 which may be in the form of aluminum or copper cylindrical tubing connected to ground should be used to enclose the capillary tube 10. This shield prevents interference from other alternating current signals which may be present and also affords protection against breakage of the hollow tube 10. Grounding has been found necessary because the capillary element produces an electrical potential and is capable of acting as an antenna for electrical frequencies if unshielded and not grounded.

Filters 30, 32 and 34 may be added as desired to filter out undesired frequency voltage components due to undesired frequency vibrations or from interfering electrical sources. These filters may consist of merely capacitors if high frequency components only are desired to be removed. For example capacitances ranging from 0 to 0.01 microfarad are suitable in direct body ballistocardiography. It may be desirable to use band pass filters to study limited frequency bands.

Referring now to Figure 3 cross piece 36 is adapted to be attached to the shins of a person in a conventional manner for taking cardiograms. The cross piece 36 may be of wood, metal or plastic for supporting the accelerometer and the electrical circuit and associated components. The cross piece may be hollowed out so that the capacitances 30, 32 and 34, the internal parts of the switch 22 and the electrical conductors may be mounted under cover plate 38 with the conductors coming out at plug 40. The three pole plugs 40 are used for connecting the two leads from the capillary element to the amplifier and the third lead is the ground wire.

The capillary element is mounted to the cross piece 36 on a hinged plate 42 with a tension spring 48 and set screw adjustment 46 at the end of the hinged plate opposite from the hinge 44 for exact leveling of the element in the horizontal plane. The level 50 may be permanently attached to the hinge plate 42 to provide an indication as to whether the tube remains level during the tests. The cross piece is grooved on its bottom surface at 52 and 54 to cradle comfortably on the shins so that the capillary element is mounted along the longitudinal axis of the body and is strapped to a fixed position in a snug but not tight manner by means of leg straps 56 and 58.

The accelerometer may be accurately calibrated by use of a pendulum. The pendulum can be constructed with a small but relatively heavy solid platform mounted from each of its four corners by fine piano wire to have a long pendulum length. The accelerometer is placed on the pendulum with the element in a horizontal position with its major axis in the direction of the swing of the pendulum. In accordance with well known principles of physics, the acceleration force due to a given displacement of the pendulum can be accurately determined. It may be noted however, that the calibration for any one accelerometer element is not the same when different capacitance is used in the circuit. The added capacitance in the circuit will not affect in any way the linearity of the accelerometer but the response from force due to given displacement of the pendulum with no capacitance added and the response to the same force with 0.009 mfd. will differ slightly. However, a correction chart may be constructed for each element of capacitance that is to be added.

The accelerometer of this type has been found to maintain a constant output to a given force for a period of greater than a half a year without showing signs of deterioration. The stability of the element depends upon several factors including the pH of the acid, the number of interfaces remaining constant and an air tight seal. The use of soft glass is not advisable since the acid will change in pH after several weeks and the output will noticeably diminish. Elements of tubing made of material such as Pyrex have been found to be relatively stable.

From the above it is apparent that there has been disclosed an accelerometer which is rugged, portable, inexpensive and which can easily be assembled and calibrated. The instrument is extremely sensitive to very small forces, has a linear output and a flat frequency response over a wide range of frequencies.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. An accelerometer accurately responsive to forces of an order of less than $10^6$ dynes comprising a tube having from 25 to 40 layers of a higher density conducting fluid separated by layers of a lower density conducting fluid that does not react with said higher density fluid, both of said fluids being insoluble in each other, and an electrode projecting into a layer of the higher density fluid near each end of the tube, said tube having an inside diameter of no more than 0.75 millimeter throughout the space between said electrodes.

2. An accelerometer accurately responsive to forces of an order of less than $10^6$ dynes comprising a tube having from 25 to 40 layers of mercury separated by layers of a substantially one normal acid, and an electrode projecting into a layer of mercury near each end of the tube, said tube being of hard glass and having a uniform inside diameter of aproximately 0.3 to 0.5 mm. throughout the space between said electrodes.

3. A ballistocardiograph comprising an accelerometer element mounted on a cross piece adapted to be mounted on the shins of a patient, said accelerometer element including a hollow tube filled with alternate layers of conducting fluids of different densities that do not appreciably react and are insoluble in one another to provide a voltage output in response to longitudinal movements of said tube, the output terminals of said hollow tube being connected to an amplifier whereby the voltage obtained from the longitudinal movements of the tube is amplified and means for indicating the output from the amplifier.

4. A portable direct body type of ballistocardiograhpy sensing apparatus which operates on the acceleration principle, comprising an accelerometer mounted on a shin board adapted to be strapped to the legs of a patient, means for horizontally orienting the longitudinal axis of the accelerometer so that it responds to components of force in the horizontal direction only, said accelerometer including a sealed capillary tube made of electrically non-conducting material having alternate layers of deformable metal and electrolytic solution, said capillary tube having an electrical output terminal near each end to provide an electrical output proportional to the acceleration applied to said tube along its longitudinal axis, shielding means surrounding said capillary tube to prevent pick-up of unwanted electrical signals, means amplifying the output of said accelerometer and means indicating said amplified output.

5. The apparatus as set forth in claim 4 having a filter connected across the output terminals of said accelerometer to filter from the output signal undesired frequency components.

References Cited in the file of this patent

UNITED STATES PATENTS

| | | |
|---|---|---|
| 2,407,363 | Bussey | Sept. 10, 1946 |
| 2,684,671 | Mendelsohn | July 27, 1954 |